(12) United States Patent
Heuft et al.

(10) Patent No.: US 10,837,917 B2
(45) Date of Patent: Nov. 17, 2020

(54) INSPECTION DEVICE WITH OPTICAL WATERMARK

(71) Applicant: HEUFT SYSTEMTECHNIK GMBH, Burgbrohl (DE)

(72) Inventors: Bernhard Heuft, Burgbrohl (DE); Wolfgang Polster, Andernach (DE); Michael Unger, Sinzig (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 16/644,366

(22) PCT Filed: Sep. 6, 2018

(86) PCT No.: PCT/EP2018/074067
§ 371 (c)(1),
(2) Date: Mar. 4, 2020

(87) PCT Pub. No.: WO2019/048577
PCT Pub. Date: Mar. 14, 2019

(65) Prior Publication Data
US 2020/0200688 A1 Jun. 25, 2020

(30) Foreign Application Priority Data
Sep. 7, 2017 (DE) .................. 10 2017 008 383

(51) Int. Cl.
*G01N 21/90* (2006.01)
*G01B 11/30* (2006.01)
(Continued)

(52) U.S. Cl.
CPC ....... *G01N 21/9018* (2013.01); *G01B 11/254* (2013.01); *G01B 11/303* (2013.01);
(Continued)

(58) Field of Classification Search
CPC .... G01N 21/90; G01N 21/9018; G01N 21/93; G01N 21/94; G01N 21/25; G01N 21/51; G01B 11/254; G01B 11/303
See application file for complete search history.

(56) References Cited

FOREIGN PATENT DOCUMENTS

| DE | 196 46 678 A1 | 5/1998 |
| DE | 196 46 694 A1 | 5/1998 |

(Continued)

OTHER PUBLICATIONS

International Preliminary Report on Patentability issued in related application PCT/EP2018/074067, with English language translation, dated Mar. 10, 2020, 14 pages.

*Primary Examiner* — Hina F Ayub
(74) *Attorney, Agent, or Firm* — Faegre Drinker Biddle & Reath LLP

(57) ABSTRACT

An inspection of containers for impurities, using a radiation source. The radiation source is designed to emit radiation that radiates through a container to be examined. The device also comprises a detection element which is designed to detect the radiation that has been emitted by the radiation source and has radiated through the container. The device further comprises an evaluation element which is designed to evaluate the radiation detected by the detection element. An identification element comprising an optical watermark is arranged in the optical path between the radiation source and the detection element.

15 Claims, 6 Drawing Sheets

(51) Int. Cl.
*G01N 21/25* (2006.01)
*G01N 21/51* (2006.01)
*G01N 21/93* (2006.01)
*G01N 21/94* (2006.01)
*G01B 11/25* (2006.01)

(52) U.S. Cl.
CPC ............ *G01N 21/25* (2013.01); *G01N 21/51* (2013.01); *G01N 21/93* (2013.01); *G01N 21/94* (2013.01)

(56) References Cited

FOREIGN PATENT DOCUMENTS

| | | |
|---|---|---|
| DE | 43 02 656 C2 | 6/1999 |
| DE | 199 46 080 C2 | 2/2002 |
| DE | 10 2006 022 492 B4 | 9/2011 |
| DE | 10 2010 043 632 A1 | 5/2012 |
| DE | 10 2012 204 277 A1 | 9/2013 |
| DE | 10 2013 103 992 A1 | 10/2014 |
| EP | 2 538 393 A1 | 12/2012 |

INSPECTION DEVICE WITH OPTICAL WATERMARK

CROSS-REFERENCE TO RELATED APPLICATIONS

This application is the U.S. national phase of the International Patent Application No. PCT/EP2018/074067 filed Sep. 6, 2018, which claims the benefit of German Patent Application No. 10 2017 008 383.5 filed Sep. 7, 2017, the entire content of which is incorporated herein by reference.

FIELD

The disclosure relates to a device for inspecting containers for impurities. The device comprises a radiation source, wherein the radiation source is designed to emit radiation, which radiates through a container to be examined. The device further comprises a detection unit which is designed to detect the radiation that has been emitted by the radiation source and has radiated through the container. The device also comprises an evaluation unit which is designed to evaluate the radiation detected by the detection unit.

BACKGROUND

The present disclosure is intended in particular for use in automatic filling systems in which the containers are transported at high speeds. In particular, the disclosure is intended for the inspection of empty containers. In automatic filling systems empty containers are examined for possible impurities or foreign bodies before being filled. For this purpose, the containers are conventionally guided through an inspection element which comprises a light source for visible light and a semiconductor camera. Light is shone through the containers and they are inspected from different angles of view. During the inspection, differences in brightness, colour or contrast are established. Any differences present are identified as impurities or contaminants in the container and the container is thereafter separated out. Containers separated out in such a way can be fed to a cleaning system or recycled.

In addition to the containers to be examined, optical components of the inspection device can also be contaminated or may exhibit stains. In particular, optical components of the inspection device can fog up. Other contaminations such as e.g. oil films or streaks from cleaning also occur in the case of optical components such as protective screens, mirrors and objective lenses. These contaminations have a low-pass characteristic and do not substantially alter the image brightness. They merely may lead to blurring of an image and may allow defects on the containers to become invisible to the detection unit. According to the state of the art the detection of such contaminants is effected by repeated tests with specially prepared analysis products, e.g. analysis containers, or by additional image acquisitions with special lighting patterns during product gaps or by extra product gaps created for this. Alternatively, contaminations of optical components of the inspection device are detected in that significant changes in the variances of structures are determined over time. The detection of these errors is thereby limited only to image areas which have strong contrasts, e.g. container edges, areas with glass emblems or imprints. Areas in which no high contrasts are typically to be expected cannot be checked in this way.

The object of the disclosure is therefore to develop an inspection device for containers in such a way that contaminations of optical components of the inspection device can be easily detected.

SUMMARY

To achieve this object, a device for inspecting containers for impurities is proposed which comprises a radiation source. The radiation source is designed to emit radiation which radiates through a container to be examined. The device further comprises a detection unit which is designed to detect the radiation that has been emitted by the radiation source and has radiated through the container. The device also comprises an evaluation unit which is designed to evaluate the radiation detected by the detection unit. An identification unit which comprises an optical watermark is arranged in the optical path between the radiation source and the detection unit.

The optical watermark in the optical path between radiation source and detection unit does not influence or only slightly influences the examination of the containers for impurities. However, the optical watermark makes it possible to check the optical components of the inspection device. During the evaluation of the pictures detected by the detection unit, the optical watermark is checked by the evaluation unit. If the detected watermark in successive pictures deviates significantly from the actual optical watermark which is located in the beam path between radiation source and detection unit, an impurity or fault in the optical components of the inspection device is recognized by the evaluation unit.

The identification unit which comprises the optical watermark is preferably arranged between the radiation source and the container to be examined. An identification of contaminations or impurities in the optical components which are located between the identification unit and the detection unit can hereby be guaranteed. In addition, impurities in the container can be detected in this case, as they can lead to a fault in the watermark.

Alternatively, the identification unit which comprises the optical watermark can be arranged between the container to be examined and the detection unit. It is hereby made possible to detect contaminations or impurities in the optical components which are located exclusively between the identification unit and the detection unit. However, contaminations in the container are disregarded in this way.

In addition, several identification units with different optical watermarks can be placed in the optical path between the radiation source and the detection unit. These several identification units can be arranged in the optical path after the optical components of the inspection device which are to be examined for faults or contaminations.

For example, the detection unit can be designed as a semiconductor camera with objective lens and deflection mirror as a camera box. In this case, it is possible to clean the protective glass of the semiconductor camera without problems. Nevertheless, a fault or contamination inside the camera box represents a significant fault. In this case, a first identification unit, comprising a first optical watermark in the optical path, can be arranged in front of the protective glass of the camera box and a second identification unit, comprising a second optical watermark in the optical path, can be arranged behind the protective glass of the camera box. If it is established by the evaluation unit that the second optical watermark is correctly detected by the detection unit, but the first watermark is not, it can be concluded that there is a contamination of or a fault on the protective glass of the camera box. Hereupon, the evaluation unit can issue a signal that the protective glass of the camera box is to be cleaned. If, in contrast, both the first watermark and the second watermark are not correctly recognized by the detection unit, it can be concluded by the evaluation unit that there is a contamination or fault inside the camera box.

Correspondingly, suitable components in the optical path between the radiation source and the detection unit can be provided with identification units and different optical watermarks, with the result that in the case of a contamination or fault it can be precisely determined by the evaluation unit which optical component of the inspection device is contaminated or faulty.

The optical watermark is designed in such a way that the detection of impurities in the containers through the watermark is not disrupted or is only slightly disrupted. For this purpose, the watermark is formed for example by fine dots, lines or structures which differ from impurities in the containers. The watermark preferably cannot be recognized by the human eye, or can only be recognized with difficulty. The watermark can comprise lines or dot patterns.

The optical watermark is preferably defined and chosen by means of the frequency spectrum present in the optical watermark. Suitable frequencies within a fixed frequency band are preferably chosen in the frequency spectrum of the watermark. Then the frequency spectrum of the watermark produced in such a way can be transformed from the frequency domain into the spatial domain by means of the known Fourier transform or another suitable orthogonal transform. This leads to the image of the optical watermark in the spatial domain. This image is then applied to the identification unit and placed in the optical path between the radiation source and the detection unit of the inspection device. The watermark is thereby impressed on the radiation of the radiation source.

To evaluate the optical watermark in the picture detected by the detection unit using the evaluation unit, the picture detected by the detection unit is preferably transformed from the spatial domain into the frequency domain. Again, a Fourier transform or another suitable orthogonal transform is preferably used in this process. The evaluation unit now checks whether the frequency spectrum of the optical watermark is present in the picture detected by the detection unit, or whether the frequency spectrum is disrupted. If the frequency spectrum is substantially present in the picture, i.e. is not or is only slightly disrupted, the evaluation unit detects that there is no fault or contamination of optical components of the inspection device and also that there is no impurity in the container to be examined. If, on the other hand, the frequency spectrum of the original watermark present in the picture detected by the detection unit is strongly distorted or disrupted, the evaluation unit detects an impurity in the container to be examined. If the frequency spectrum in successive pictures is strongly distorted or disrupted, the evaluation unit detects a contamination of or a fault in an optical component of the inspection device. If, as described above, several different optical watermarks are used, the evaluation unit further detects which of the optical components of the inspection device is affected by a fault or contamination.

The frequency spectrum of the optical watermark is chosen in such a way that all frequencies in the frequency spectrum of the watermark can still be detected by the detection unit. The upper limit frequency is also chosen such that no artefacts are produced by the optical components of the inspection device, the container to be examined or by the evaluation in the evaluation unit. The lowest frequency in the frequency spectrum of the optical watermark is chosen such that the detection of impurities in the containers to be examined is not disrupted or is only minimally disrupted. In other words, the frequency spectrum of the optical watermark is chosen such that the detection of impurities in containers to be examined is not significantly disrupted, but the frequencies of the optical watermark can be detected by the detection unit. If several watermarks are used at the same time, these preferably complement each other spectrally and therefore do not share any common frequencies.

The frequency spectrum of the optical watermark is further chosen in such a way that diffuse impurities of optical components of the inspection device in the optical path between the radiation source and the detection unit lead to a fault in the optical watermark. It is thus guaranteed that e.g. oil films, streaks from cleaning, fogging etc. on optical components of the inspection device can be recognized.

The radiation source is preferably an electromagnetic radiation source, e.g. a radiation source for light in the visible range. The radiation source can further be designed to emit UV or infrared light or a combination thereof. Infrared radiation can advantageously be used in the case of coloured containers, in particular in the case of brown glass bottles.

The radiation source can be operated in a pulsed manner and controlled such that the radiation pulses are emitted only when a container to be examined is located in front of the radiation source. Alternatively, the radiation source can be operated continuously.

The present disclosure can be used for the inspection of containers made of any desired material substantially transparent for the radiation of the radiation source. The disclosure can particularly advantageously be used in the case of containers made of glass or transparent plastics such as e.g. PET. In particular, the disclosure can be applied to the inspection of glass bottles in the beverage industry.

The detection unit is preferably a colour camera customary in the trade, in particular a semiconductor camera. Infrared and UV cameras can likewise be used. In order to prevent or reduce motion blurring, shutter cameras with short shutter speeds can be used. This is particularly advantageous if the radiation source is operated continuously.

The disclosure further relates to a method for inspecting containers for impurities, wherein the method comprises the following method steps:

providing a radiation source, wherein the radiation source is designed to emit radiation which radiates through a container to be examined, providing a detection unit which is designed to detect the radiation that has been emitted by the radiation source and has radiated through the container, providing an evaluation unit which is designed to evaluate the radiation detected by the detection unit, and arranging an identification unit, comprising an optical watermark, in the optical path between the radiation source and the detection unit, evaluating, using the evaluation unit, the watermark in the picture detected by the detection unit.

During the method step of evaluation, the evaluation unit preferably concludes, by means of a frequency analysis method, from an alteration of the frequency spectrum of the watermark in the picture detected by the detection unit that there is an impurity or fault in the optical path between the radiation source and the detection unit. In this process the evaluation unit detects an impurity or fault if a significant alteration occurs in the frequency spectrum of the watermark.

Typically, one picture of each container to be examined is detected by the detection unit. If the evaluation unit in the case of a single picture detects an impurity or fault in the optical path between the radiation source and the detection unit, it is assumed that the container is contaminated. For example, the container can be fogged up or contaminated with rust, with the result that there is a diffuse impurity in the container. If, in contrast, a stationary fault or impurity is detected by the evaluation unit in the case of several successive detected pictures of the detection unit, the evaluation unit detects an impurity or fault in an optical component of the inspection device in the optical path between identification unit and detection unit. In this case it is unlikely that a plurality of containers will have diffuse impurities at the same site.

In order to increase the inspection accuracy and to assign a location to a fault, the evaluation unit preferably breaks the picture detected by the detection unit down into a number of partial areas, e.g. with 64×64 or 32×32 pixels in each case. These partial areas of the whole picture are in each case transformed by the evaluation unit from the spatial domain into the frequency domain and the obtained frequency spectrum of the individual partial areas is compared with the frequency spectrum of the optical watermark. In the fault-free case, the original frequency pattern of the optical watermark can be observed in every partial area of the picture, wherein the original frequency pattern may be systematically distorted because of the container. A stronger distortion or attenuation of the frequency spectrum compared with the original frequency spectrum of the optical watermark indicates a contamination. As described above, a one-time detection of a distorted or disrupted frequency spectrum can be attributed to a contaminated container. However, if distorted or disrupted frequency spectra are detected in successive pictures by the evaluation unit, it is concluded that there is an impurity or fault in an optical component of the inspection device in the optical path between radiation source and detection unit.

BRIEF DESCRIPTION OF THE DRAWINGS

Various embodiments are illustrated in the drawings, in which.

DETAILED DESCRIPTION

Figure 1:
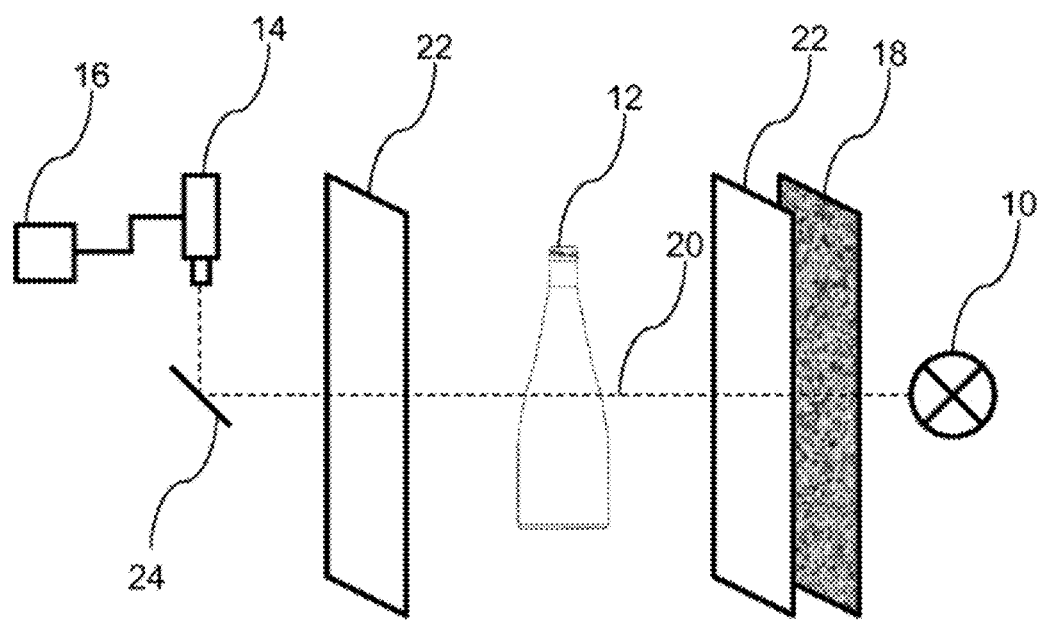
FIG. 1 is an illustrative representation of an embodiment of the inspection device according to an embodiment with identification unit.

FIG. 1 shows a device for inspecting containers for impurities. The device comprises a radiation source 10. The radiation source 10 is designed to emit radiation. The radiation radiates through a container 12 to be examined. After the radiation of the radiation source 10 has radiated through the container 12 to be examined, the radiation enters a detection unit 14. The picture detected by the detection unit 14 is transmitted to an evaluation unit 16 for further evaluation.

An identification unit 18 is arranged between the radiation source 10 and the container 12 to be examined, wherein the identification unit 18 comprises an optical watermark.

Various optical components 22, 24 of the inspection device can be provided in the optical path 20 between the radiation source 10 and the detection unit 14. These can be protective glass screens 22 or deflection mirrors 24. The radiation source 10 and the detection unit 14 are also to be regarded as optical components of the inspection device. The containers 12 to be examined, as well as all of the optical components 10, 14, 22, 24 of the inspection device, can exhibit contaminations. In the case of the containers 12 to be examined, these impurities are detected in a known way by the detection unit 14 and established by the evaluation unit 16. On the other hand, faults or impurities on the optical components of the inspection device can further be detected by the device according to the disclosure.

For this purpose, the identification unit 18 is provided with the optical watermark. The optical watermark is designed in such a way that the detection of impurities on the container 12 to be examined is not or is barely impaired. However, if there is a fault or impurity in the case of one of the optical components of the inspection device, this leads to an alteration of the optical watermark in the case of the picture detected by the detection unit 14. This can be established by the evaluation unit 16.

In the example shown in FIG. 1, the identification unit 18 with the optical watermark is arranged between a first protective glass 22 and the radiation source 10. Through the provision of the identification unit 18 with the optical watermark at this site, a fault or impurity in the case of the protective glasses 22, the deflection mirror 24 and optical components inside the detection unit 14 can be established. Faults or contaminations inside the radiation source 10 cannot be detected.

Figure 2:
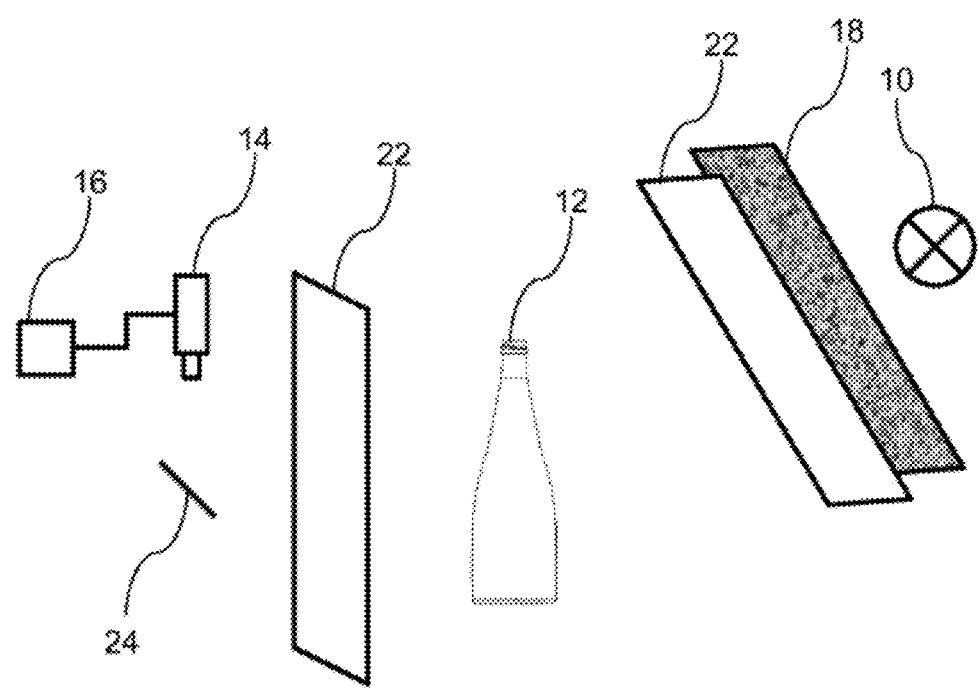
FIG. 2 is an illustrative representation of an alternative embodiment of the inspection device according to an embodiment with identification unit.
Figure 3:
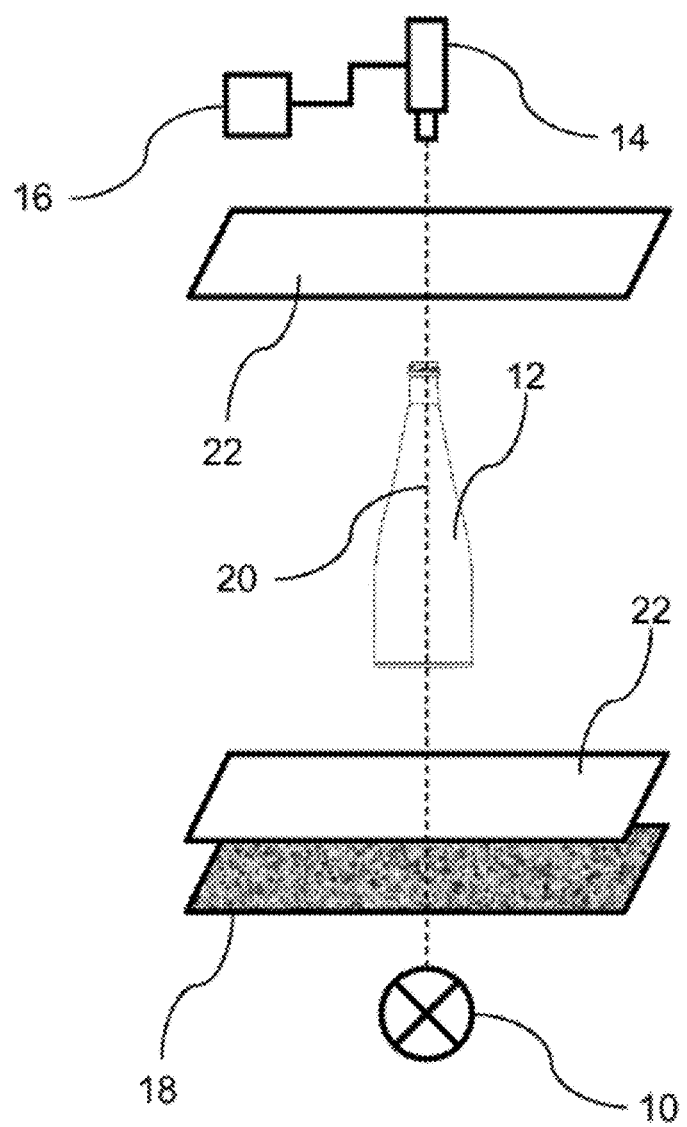
FIG. 3 is an illustrative representation of a further alternative embodiment of the inspection device according to an embodiment with identification unit.

FIGS. 2 and 3 show different arrangements of the optical components of the inspection device. FIG. 2 shows a tilting of the radiation source with respect to the optical path shown in FIG. 1. FIG. 3 shows a bottom inspection.

Figure 4:
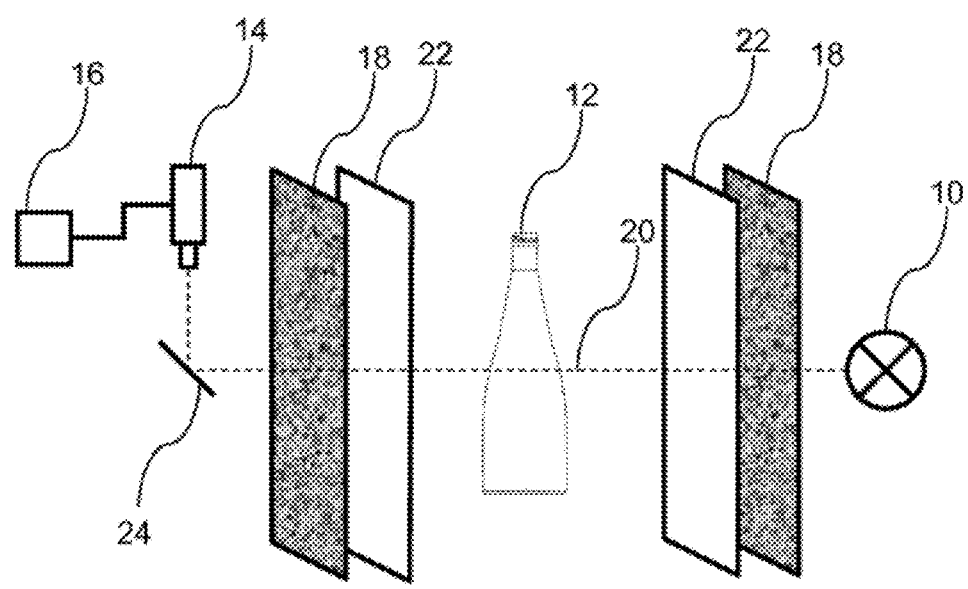
FIG. 4 is an illustrative representation of a further alternative embodiment of the inspection device according to an embodiment with identification unit.

FIG. 4 shows an embodiment in which two identification units 18 with different optical watermarks in each case are used. Any fault or contamination present in optical components of the inspection device can hereby be ascribed to the individual optical components. If, for example, the right-hand protective glass 22 shown in FIG. 4 is fogged up, the picture detected by the detection unit 14 is evaluated by the evaluation unit 16 to the effect that the optical watermark, which comprises the right-hand identification unit 18 shown in FIG. 4, is faulty. In contrast, the optical watermark, which comprises the left-hand identification unit 18 shown in FIG. 4, will not be faulty. Depending on which optical components of the identification device are to be examined for the presence of faults and impurities, separate identification units with different optical watermarks can be placed in front of and/or behind these optical components.

The identification units 18 can be applied as films to the optical components of the identification device or introduced into the optical path 20 between the radiation source 10 and the detection unit 14 by other suitable measures, for example by screens.

Figure 5A:
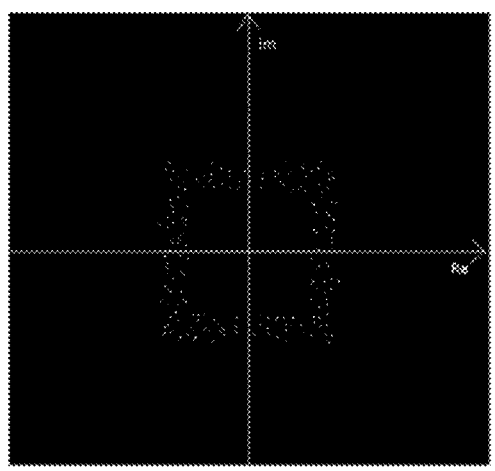
FIGS. 5A and 5B show an embodiment of an optical watermark in the frequency domain and in the spatial domain.
Figure 5B:
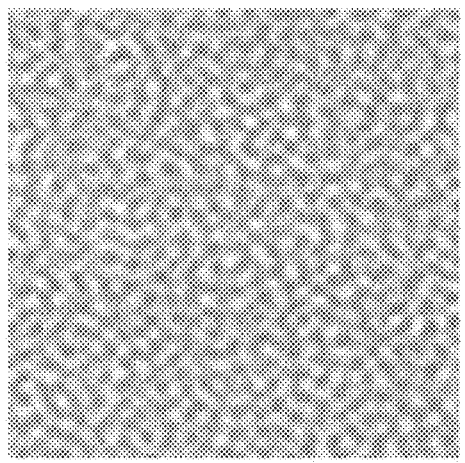

FIGS. 5A and 5B show an embodiment of an optical watermark in the spatial domain, see FIG. 5B, and in the frequency domain, see FIG. 5A. The conversion of an optical watermark from the spatial domain to the frequency domain and the other way round takes place by the known Fourier transform or another suitable orthogonal transform. An optical watermark such as is shown in FIGS. 5A and 5B is preferably selected. In this case, a suitable frequency spectrum is produced, wherein the frequencies are chosen such that the frequencies can be detected by the detection unit 14 and at the same time do not or do not substantially disrupt the detection of impurities on the containers 12 to be examined. FIG. 5A shows such a selection of a suitable frequency spectrum, wherein FIG. 5A represents the real part and the imaginary part in the frequency spectrum of the thus-produced optical watermark. A watermark is produced after the transformation of this frequency spectrum into the spatial domain. An enlarged partial section of this optical watermark is shown in FIG. 5B. This optical watermark is now, as shown in FIGS. 1 to 4, introduced into the optical path 20 between the radiation source 10 and the detection unit 14.

Figure 6A:
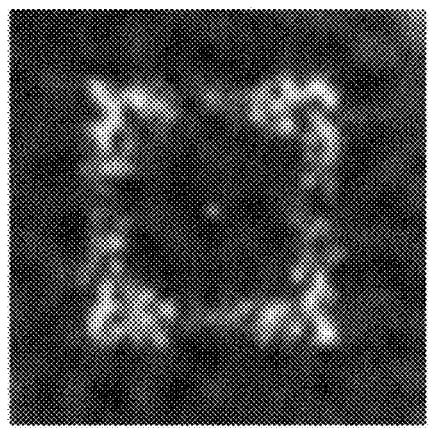
FIGS. 6A and 6B show a frequency spectrum of a partial area evaluated by the evaluation unit.
Figure 6B:
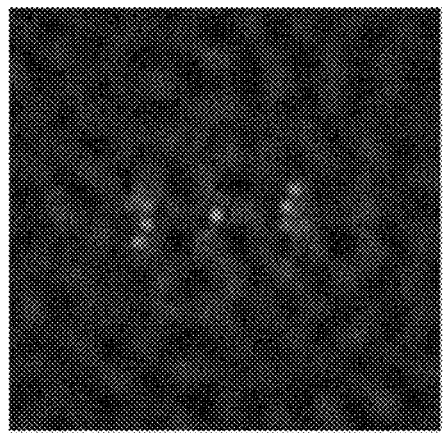

FIGS. 6A and 6B show exemplary evaluations of the pictures detected by the detection unit 14. In this process the evaluation unit breaks a picture detected by the detection unit 14 down into several partial areas. FIGS. 6A and 6B in each case show the frequency spectrum of two such partial areas. FIG. 6A shows the frequency spectrum of a partial area in which the frequency spectrum of the optical watermark which has been introduced into the optical path 20 between the radiation source 10 and the detection device 14 was able to be substantially reconstructed. In the case of this picture, the evaluation unit would therefore detect that there is no contamination or fault in the optical path 20.

FIG. 6B shows the frequency spectrum of a partial area in which there is a fault or impurity in the optical path 20. If such a fault or impurity is detected merely in the case of one picture, the evaluation unit concludes that a contaminated container 20 has been present. However, if such a fault or impurity is detected at the same site in the case of several successive pictures, the evaluation unit establishes that there is a fault or impurity in one of the optical components of the inspection device. If, as described above, several identification units 18 with different optical watermarks are used, the evaluation unit 16 can in this case moreover establish which optical component of the inspection device is faulty or contaminated.

The invention claimed is:

1. A device for inspecting containers for impurities, comprising:
 a radiation source, wherein the radiation source is configured to emit radiation which radiates through a container to be examined,
 a detection unit which is configured to detect the radiation that has been emitted by the radiation source and has radiated through the container,
 an identification unit, comprising an optical watermark, is arranged in the optical path between the radiation source and the detection unit, and
 an evaluation unit which is configured to evaluate the radiation detected by the detection unit, wherein the watermark in a picture detected by the detection unit is evaluated.

2. The device according to claim 1, wherein the identification unit is arranged between the radiation source and the container to be examined.

3. The device according to claim 1, wherein the identification unit is arranged between the container to be examined and the detection unit.

4. The device according to claim 1, wherein a first identification unit, comprising a first optical watermark, is arranged in the optical path between the radiation source and the container to be examined, and a second identification unit, comprising a second optical watermark, is arranged in the optical path between the container to be examined and the detection unit.

5. The device according to claim 1, wherein the optical watermark is configured not to influence the detection of impurities in the container to be examined by the evaluation unit or to influence it only insignificantly, and wherein the watermark is configured in such a way that impurities or faults in optical components of the inspection device in the optical path between the radiation source and the detection unit can be detected by the evaluation unit.

6. The device according to claim 1, wherein the watermark comprises line or dot patterns.

7. The device according to claim 1, wherein the watermark has suitable frequencies in a fixed frequency band in the frequency spectrum of the watermark.

8. The device according to claim 1, wherein the frequency spectrum of the watermark is chosen in such a way that the lowest frequency in the frequency spectrum of the watermark is greater than the highest frequency to be expected in the frequency spectrum of an impurity in a container to be examined.

9. The device according to claim 1, wherein the frequency spectrum of the watermark is chosen in such a way that the highest frequency in the frequency spectrum of the watermark is smaller than the maximum frequency detectable without artefacts by the detection unit.

10. The device according to claim 1, wherein the frequency spectrum of the watermark is chosen in such a way that the frequency spectrum of the watermark is attenuated or destroyed by diffuse impurities in the optical path between the radiation source and the detection unit.

11. A method for inspecting containers for impurities, wherein the method comprises the following steps:
 providing a radiation source, wherein the radiation source is configured to emit radiation which radiates through a container to be examined,
 providing a detection unit which is configured to detect the radiation that has been emitted by the radiation source and has radiated through the container,
 providing an evaluation unit which is configured to evaluate the radiation detected by the detection unit,
 arranging an identification unit, comprising an optical watermark, in the optical path between the radiation source and the detection unit, and
 evaluating, using the evaluation unit, the watermark in a picture detected by the detection unit.

12. The method according to claim 11, wherein, during the method step of evaluating, the evaluation unit concludes, by means of a frequency analysis method, from a deviation of the frequency spectrum of the picture detected by the detection unit of the container to be examined from the spectrum of the optical watermark that there is an impurity or fault in the optical path between the radiation source and the detection unit.

13. The method according to claim 11, wherein, during the method step of evaluating, the evaluation unit concludes, by means of a frequency analysis method, from a deviation of the frequency spectrum of the picture detected by the detection unit of the container to be examined from the spectrum of the optical watermark that there are diffuse impurities in the container.

14. The method according to claim 11, wherein, during the method step of evaluating, the evaluation unit concludes, by means of a frequency analysis method, from a deviation of the frequency spectrum of the picture detected by the detection unit of the container to be examined from the spectrum of the optical watermark in several successive pictures that there is an impurity or fault in optical components of the inspection device in the optical path between the radiation source and the detection unit.

15. The method according to claim 11, wherein, during the method step of evaluating, the evaluation unit evaluates partial areas of the picture detected by the detection unit, wherein the evaluation unit compares the frequency spectrum of the partial area with the frequency spectrum of the watermark, and wherein in the case of a deviation of the frequency spectrum of an analyzed partial area the evaluation unit concludes that there is an impurity or fault in the optical path between the radiation source and the detection unit.

* * * * *